(12) United States Patent
Jefferds

(10) Patent No.: US 6,520,116 B1
(45) Date of Patent: Feb. 18, 2003

(54) METHOD AND APPARATUS FOR SUPPORTING AQUACULTURED MUSSELS

(75) Inventor: Ian W. Jefferds, Coupeville, WA (US)

(73) Assignee: Penn Cove Shellfish, LLC, Coupeville, WA (US)

( * ) Notice: Subject to any disclaimer, the term of this patent is extended or adjusted under 35 U.S.C. 154(b) by 0 days.

(21) Appl. No.: 09/672,115

(22) Filed: Sep. 27, 2000

Related U.S. Application Data

(60) Provisional application No. 60/157,255, filed on Oct. 1, 1999.

(51) Int. Cl.[7] .............................................. A01K 61/00
(52) U.S. Cl. ...................................................... 119/238
(58) Field of Search ................................. 119/234, 237, 119/238; 24/380, 706.2; 411/512, 513, 521

(56) References Cited

U.S. PATENT DOCUMENTS

| 639,337 A | * | 12/1899 | Anthony | ...................... 403/155 |
| 5,308,207 A | * | 5/1994 | Jaskowiak | .................. 411/513 |

FOREIGN PATENT DOCUMENTS

| FR | 2636206 A2 | * | 3/1991 | .................. 119/238 |

* cited by examiner

Primary Examiner—Robert P. Swiatek
(74) Attorney, Agent, or Firm—Robert B. Hughes; Hughes Law Firm, PLLC

(57) ABSTRACT

A support apparatus adapted to support mussels in an aquatic mussel harvesting operation. The apparatus has a support extension that is adapted to be inserted into a harvesting support that is adapted to facilitate growth of mussels. An upper surface is provided to give the aquatic mussels support.

27 Claims, 3 Drawing Sheets

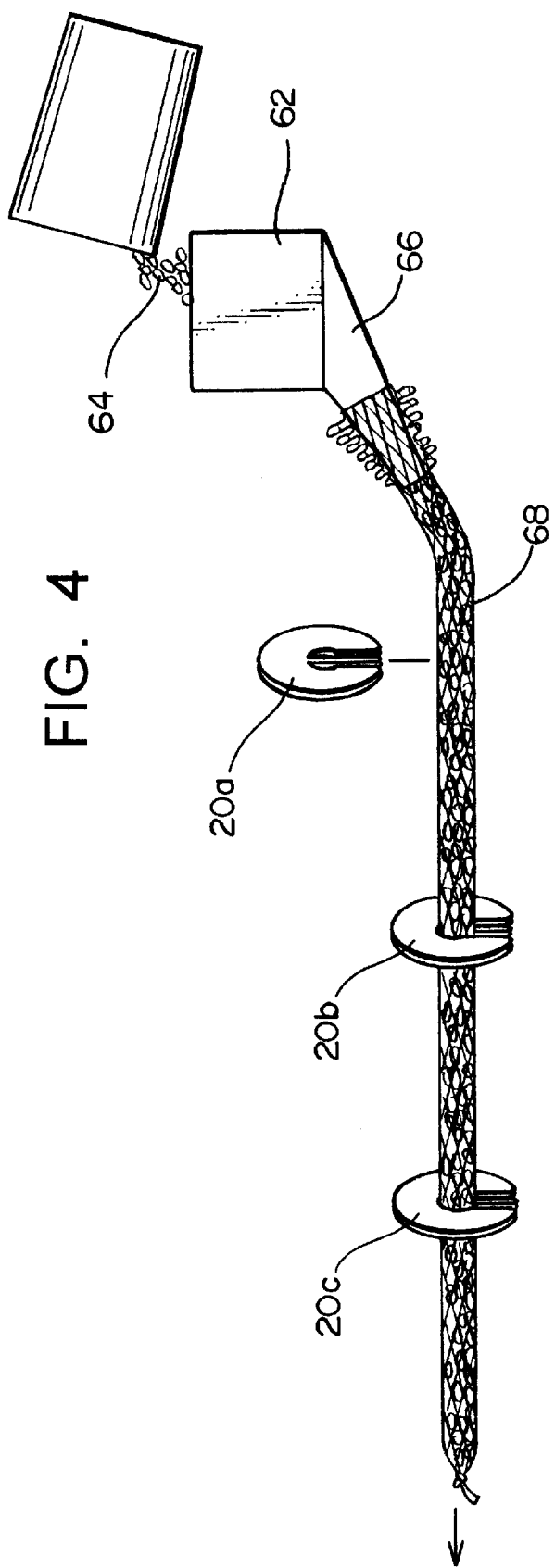
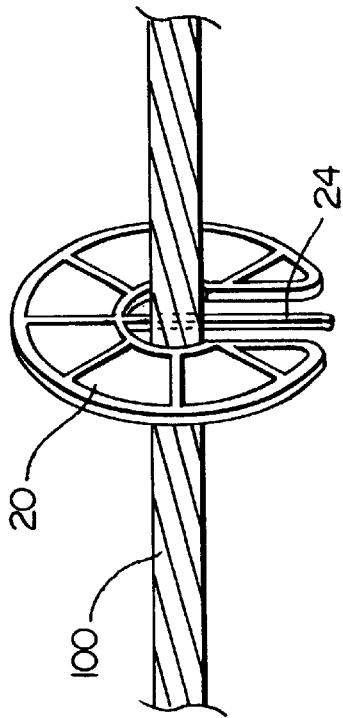

METHOD AND APPARATUS FOR SUPPORTING AQUACULTURED MUSSELS

The present invention is based upon, and claims the benefit of, U.S. Provisional Application S.N. 60/157,255, filed Oct. 1, 1999.

BACKGROUND OF THE INVENTION

1. Field of the Invention

The device is used in the mussel aquaculture farming industry. In general the concept is a support device that attaches to a vertical attachment means which; mussels cling on to grow.

2. Background of the Invention

The mussel farming industry has developed techniques of culturing and harvesting mussels. One such method is to hang substantially vertical seed collector cords or lines below the surface of the ocean. The lines are about eight to twenty feet in length and after mussels give spawn, the small larval seed mussels attach to the lines to grow. After several months the seed mussels will grow in dense clusters along the lines. When there is not sufficient space on the lines for the mussels to adequately grow further (the seed mussels are about 5 mm–30 mm in length), the mussel farmer will withdraw the seed collector lines from the ocean and separate the seed mussels from the collector line.

At this point the seed or juvenile mussels are injected into a mesh tubing and reinserted back into the ocean. The mesh tubing is made from a web netting material that radially expands to a larger circumference. The mesh tubing provides more surface area for the seed mussels to cling thereon and it will support the mussels as they grow in size and grow through the mesh to a size of several inches long. As the mussels grow; they move radially outwardly through the mesh tubing in order to be able to open their valves and gather plankton from the seawater. As they increase in size the mussels rely on the mesh tubing and also the mussels below them for support. The mussels eventually are attached to the outside of the mesh tubing and as they grow larger they will rest upon the mussel immediately below them and that mussel will be partially supported by the mussel below it. If some of the supporting mussels loses their foothold from the mesh tubing a catastrophic collapse can occur where strips of mussels fall from the mesh tubing to the floor of the ocean bay and are unharvestable at that point.

To prevent the catastrophic loss of mussels, support rods have been used. The support rods were essentially a stick or peg about eight inches long that stuck through the diameter of the web tubing. When the seed mussels are inserted into the mesh tubing and placed back into the ocean, a support rod was placed between the holes in the mesh about every 12–18 inches along the eight to the entire length of mesh tubing. When the support rods where inserted into the mesh they had two extensions that extended out opposite sides of the mesh. The support rods did supply some support for the mussels that were directly above each extension of a rod; however, the support rods only had limited surface area in the horizontal plane and mussels that were ninety degrees from each extension of the support rods received no direct support from the support rod, support was only from those mussels adjacent to the mesh tubing.

3. Background Art

A search to the prior art has revealed numerous embodiments in the area of aquatic culture harvesting. A brief summary of the patents that resulted in a patentability search is listed below.

U.S. Pat. No. 5,653,193 Marissal, shows a mollusk raising system in which support trays 30, are supported in net tubes 24. The tubes with the included platforms are suspended in the water.

The invention is primarily directed to growing oysters within the net 24. As seen in FIG. 2 the tray 30 is positioned within the net 24 and can be held therein by a number of attachment means which are shown in FIGS. 6–14.

As seen in FIGS. 16 and 17, the rope 62 extends through the apertures 40 which are located at the edge portions of the disc 30 (see FIG. 2). The blocking element 63 which fits into the frustoconical aperture 40 is best seen in FIG. 17, where the lugs 76 are adapted to engage the rope 62.

FIGS. 18–20 shows another fastening method where the rapid fastener 84 serves as a means to secure the tray 30 to the netting 24 where FIG. 18 is a side elevational view of the edge portions of the tray 16 which is shown in FIG. 6. Apparently, the cord is wrapped around the netting and the annular groove 16 of the tray 30 and the cord ends 81 and 82 are positioned in the locking semi shells 86 and 88 of the rapid fastener 84 (see FIG. 19).

U.S. Pat. No. 5,515,813 Wilkerson, shows a series of growth plates 12, that may be stacked and with a mesh cover that is placed over the plates.

As seen in FIG. 3, the aquatic cultivator 12 has a bore 32 which allows a tether line or cable 20 to pass therethrough. As seen in FIG. 7, apparently the aquatic cultivator 12 is held in place by putting a knot 22 in the line 20.

U.S. Pat. No. 5,511,514 Hichins et al, shows a system in which shellfish which do not attach to support means are raised in the same housing with the shellfish have attached. There is a rope 5 and an outer mesh housing tube that holds shellfish that can secure themselves to the rope and shellfish who can not secure themselves to the rope.

The description discloses a method of cultivating juvenile shellfish that are passed from a hopper 2 into the stocking 4. The culture rope 5 supports the structure and is apparently tied off at the lower portion.

U.S. Pat. No. 4,594,965 Asher et al, show a means for carrying out in the aquaculture in which there is a tube 31, and a series of dividers 32 that create growing chambers 33. The patent relates to the use of electric fields in the system.

As seen in FIG. 1 the fence 11 carries an electric potential to ward off unwanted marine life. The conduit 12, as seen in FIG. 2, is made from a flexible material and contains a plurality of tubes 14–18 therein. Each of these tubes 14–18 caring different amounts of nutrients which are described in column 3, lines 10+.

U.S. Pat. No. 3,741,159 Halaunbrenner, shows a series of baskets that are joined and hung under water for the growth of shellfish.

As seen in FIG. 3, the baskets float and are held down by weights 29. As seen in FIGS. 6–7, the pots 40 are placed in compartments 41 of the baskets 11–14.

U.S. Pat. No. 3,572,292 Quayle et al, shows a series of platforms or oyster bed clutches that are in the form of disc like elements that are secured in a series a line 34, such as shown in FIGS. 6, and 7.

As seen in FIG. 7 the clutch 10 is supported by the base portion 39 which is rigidly attached to the rope 34. The clutches are positioned so that the clutch immediately above and below each clutch is 90 degrees in the horizontal plane (see 11a in FIG. 7).

FIG. 6 shows the clutches stacked in a manner where they are all in the same relative orientation and the knobs 30 and 31 provide separation.

U.S. Pat. No. 249,942 Hughes, shows an oyster raising system in which a scow, with adjustable buoyancy, is provided with slats "F", that support layers of oysters, so the bottom layers are not crushed.

The background art fails to disclose a support structure that can be retrofitted to existing cultivating nets where proper support is provided for aquatic mussels so that you not become this attached from the net and hence is not retrievable for the aquatic farmer.

SUMMARY OF THE INVENTION

The invention relates to an improved method and device to give support to aquacultured mussels that are clinging to a mesh tubing, rope or similar structure. In general the device (herein referred to the 'mussel support', 'support structure', 'mussel support structure 'or 'mussel support disc') comprises a support portion, a clearance gap and a support extension. The support portion is a circular shape in the preferred embodiment (however it could be square, rectangular etc.) and covers more surface area in the horizontal plane to provide adequate support for growing aquatic mussels. The clearance gap is of sufficient tangential width to allow the support portion to be substantially concentric with the mesh tubing. The support extension is positioned in the clearance gap and is designed to extend through the mesh tubing and support the entire mussel support structure in a specific location along the length of mesh tubing. In the preferred form, the support extension has locking teeth that allow for easy insertion into the mesh and not easily removed.

BRIEF DESCRIPTION OF THE DRAWINGS

FIG. 4 schematically shows a method of cultivating mussels where a hopper inserts seed mussels into the mesh tubing and the supports are placed at vertically spaced intervals as the assembly is lowered into the ocean;

FIG. 5 is a view of a second embodiment of the present invention where the mesh tubing is not employed and only a rope is provided for the mussels to cling thereon.

DETAILED DESCRIPTION OF PREFERRED EMBODIMENTS OF THE PRESENT INVENTION

Figure 1:
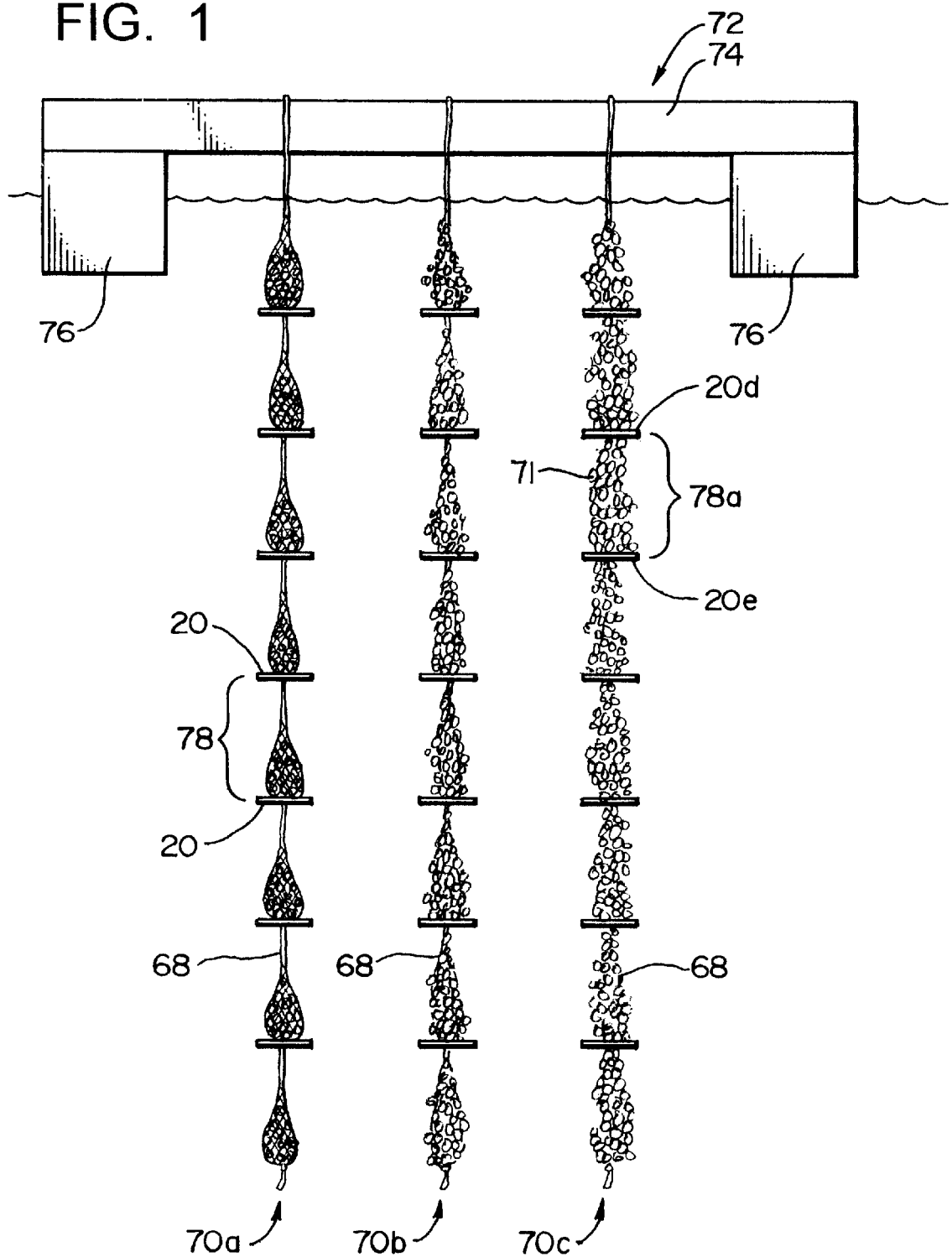
FIG. 1 is a side view to a mussel growing operation where three stages of mussel development with respect to time where the left most mussel assembly are freshly inserted seed mussels into the mesh tubing lowered into the sea and the right most illustrates fully developed mussels.

As seen in FIG. 1, a mussel growing operation comprises numerous vertical mesh tubings that are submerged in the water. Numerous mussel supports 20 are inserted about 12–18 inches vertically from each other to each mesh tubing 68 throughout the entire length of the mesh tube.

Figure 2:
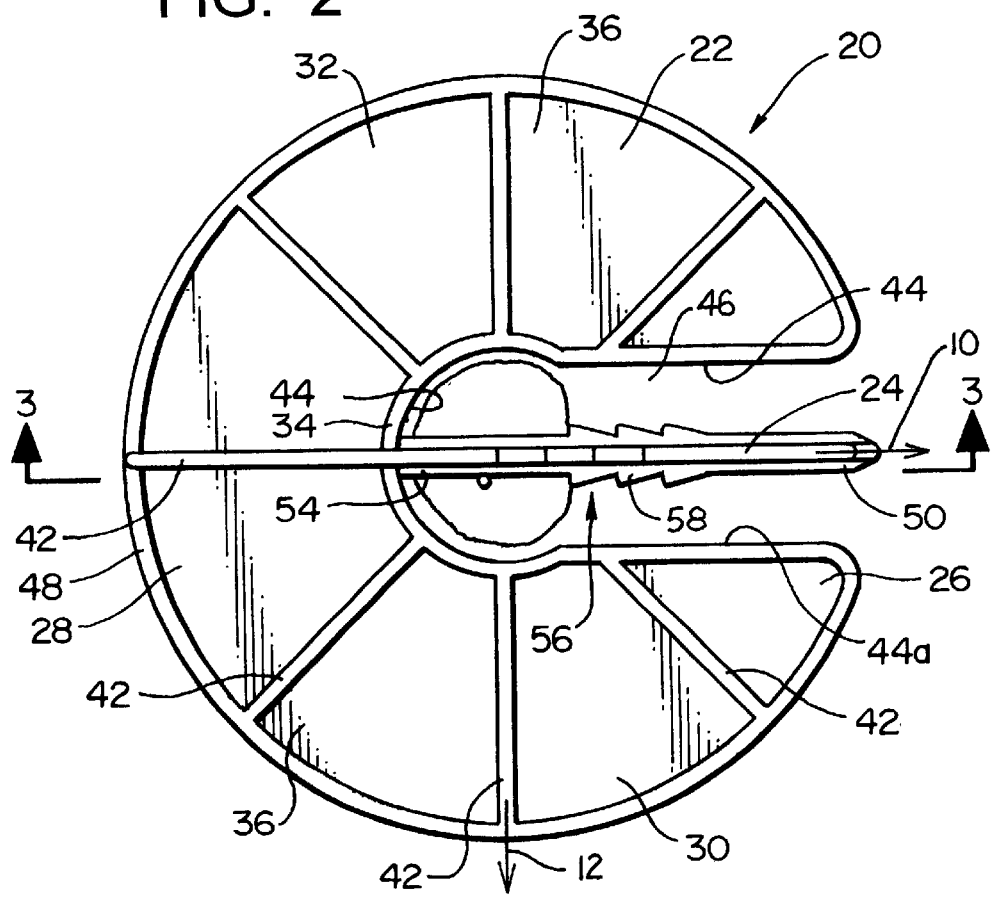
FIG. 2 is a cross-sectional top view of a support structure inserted through and net.
Figure 3:
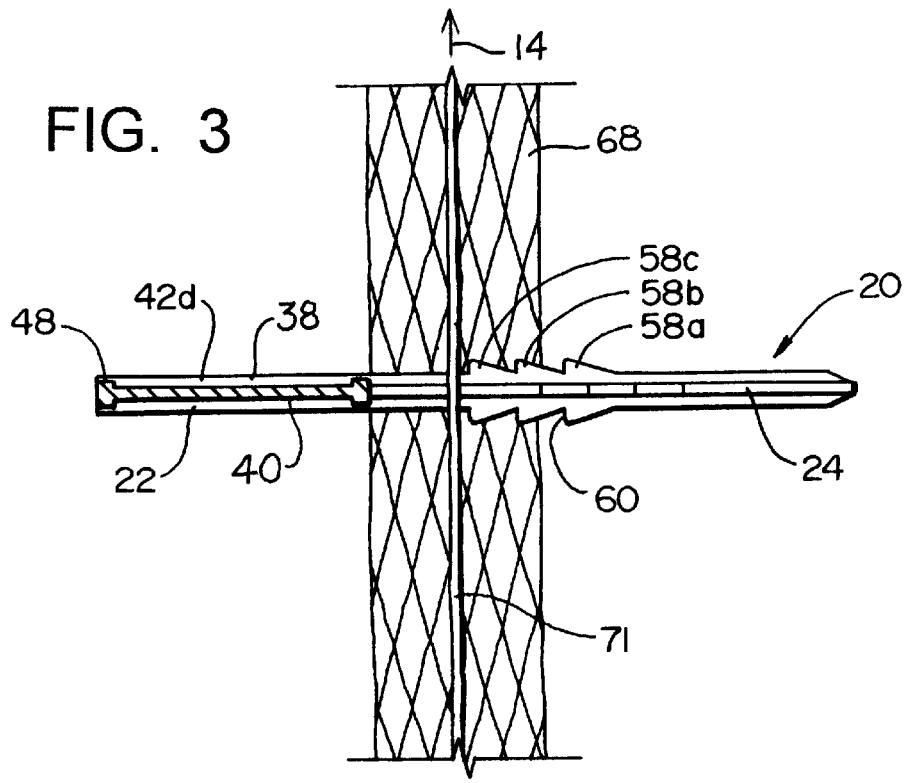
FIG. 3 is a horizontal cross-sectional view of the support structure and net taken then line 3—3 in FIG. 2.

To facilitate the description of the support apparatus and the method of cultivating aquatic mussels, an axis system is defined whereas seen in FIG. 2, the arrow 10 indicates a longitudinal direction where the arrow points in a forward direction and the arrow 12 indicates a lateral direction. As seen in FIG. 3, the arrow 14 indicates a vertical axis.

As seen in FIG. 2, the mussel support (or support structure) 20 comprises a support portion 22 and a support extension 24. In general, the support structure 20 has a forward region 26, a rearward region 28, lateral regions 30 and 32. Further, the support structure 20 has a radial inward portion generally defined as 34 and a radial outward portion 36 defined as the radially outward portions from the radial inward portion of the support apparatus 20.

In the preferred form, the support portion 22 is rounded and has an upper support surface 38 and a bottom surface 40. Radial extensions (ribs) 42 extend radially and help provide strength and rigidity for the support portion 22. A surface 44 defines a gap portion 46 which is a U-shaped cut out that has a width which is a sufficient distance to allow for the diameter of the mesh tubing 68 to horizontally slide there-inbetween. Located in the radially outward portions 36, is an annular flange 48 that has a vertical heights slightly greater than the average thickness of the support portion 22. The annular flange 48 provides additional strength and rigidity for the mussel support 20.

The support extension 24 has a forward portion 50, a middle portion 52 and a base portion 54. The base portion 54 is rigidly attached to the radially inward portion 34 of the support portion 22. In the preferred form the support extension 24 and support portion 22 are a unitary structure where the preferred manufacturing technique is described further herein.

The support extension 24 further has a locking assembly 56 that comprises a plurality of locking teeth 58. The locking teeth 58 have a locking surface 60 that is adapted to engage the mesh tubing 68 described further herein. The extension 26 is adapted to be inserted through the mesh tubing 68. The surface portion 44b is rounded and adapted to rest against the mesh tubing 68. Locking teeth 58 allow for the support extension to be easily inserted into the web netting; however, the lock surface 60 engages the web netting to prevent accidental removal of the mussel disc 20 from the mesh tubing 68 due to such natural activity such as the tidal currents and mussel activity.

There will now be a general discussion of the method of cultivating shellfish namely mussels. As seen in FIG. 4, there is a hopper 62 that is adapted to receive juvenile mussels 64. The hopper 62 has a nozzle extension 66 that is adapted to fill mesh tubing (or harvesting support) 68. Hopper assemblies such as 62 are well-known in the art as well as methods of inserted juvenile mussels into a mesh tubing.

When the mesh tubing 68 is filled with seed mussels, a mussel support 20 is inserted through the tubing as shown in FIG. 4. The locking teeth 58 of the support extension 24 slide through the holes of the mesh tubing 68. Support apparatus 20b and 20c as seen in FIG. 4, shows the mussel support 20 fully inserted through the mesh tubing 68. When the mussel support 20 is fully inserted, the center of the mussel support is approximately concentric with the center of the mesh tubing 68 with the seed mussels contained therein (see FIGS. 1 and 4), and the support portion 22 is in a position to provide a base for the mussels immediately above the mussel support 20. In one form of the present invention in the center portion of the mesh tubing is a rope 71. The rope 71 can be a nylon three-way weave where the support extension 24 is threaded therethrough and the rope provides additional support.

After (or while) the supports 20 are inserted into the mesh tubing 68, the mesh tubing 68 is gradually lowered into the ocean water. When all of the mesh tubing has been filled with seed (or juvenile) mussels and the supports have been inserted into the mesh tube, the mesh tubes are lowered and the mussel culture looks something like the cultivating assembly 70a as shown in the left most portion of FIG. 1.

FIG. 1 illustrates a mussel cultivating operation where there is a support structure 72 comprising horizontal support members 74 and floats 76. The cultivating assemblies 70 are fastened to the support members 74 by any conventional method. In operation, there could be hundreds of cultivating assemblies 70 harvesting mussels 71.

Each mussel support 20 and the mussels thereabove to just below the next adjacent mussel support 20 are referred to as a mussel section 78. As the seed mussels grow, each mussel support 20 will provide support to the mussels immediately thereabove (see cultivating assembly 70b). The weight of the mussels on the support is transferred to the mesh tubing 68 through support extension 24. So each mussel support 20 will provide a base for the mussels thereabove up to the next mussel support 20.

To illustrate the benefits of the support apparatus 20, let us assume that a mussel (indicated at 71) loses its foothold. With the invention employed, this occurrence only effects the mussels in the respective mussel section 78a. In other words, the mussels located at vertically above support 20d are not affected by the failure of a mussel located therebelow. Further, using the mussel support reduces the weight upon the mussels located in the bottom portion of the twenty some feet of mesh tubing 68 which reduces the chances of catastrophic failure where large numbers of mussels are lost to the bottom of the ocean bay.

In the preferred form the support apparatus 20 is circular in the horizontal plane; however, in the broader scope of the invention other shapes could be designed without departing from the teachings of the invention. Further, the preferred form shows a support disc (apparatus) 20 that is substantially planar; however, in the broader scope of the invention other shapes could be employed such as a frustoconical disc with an upward slope. The preferred method of manufacturing the support apparatus 20 is plastic injection with a polyurethane blend plastic. However, other methods could be employed such as a stamping manufacturing means.

FIG. 5 shows a second embodiment of the present invention where the disk 20 is inserted through a rope (or harvesting support) 100. The rope 100 can be a three strand rope where the support extension 24 passes there in between the rope strands. Any conventional rope can be employed. In this embodiment the mussels can actually grow on the rope 100 to full maturity. When the mussels are fully mature the aquatic farmer can extract the rope from the ocean and cultivate the mussels. This embodiment reduces the need of culturing seed mussels and reasserting them into the sea inside the mesh tubing. The support the apparatus 20 will still provide support to the growing mussels as they mature. The support apparatuses 20 can likewise be spaced vertically along the rope 100 in intervals of 12 inches to 18 inches and even as high as 24 inches in some applications.

While the invention is susceptible of various modifications and alternative forms, specific embodiments thereof have been shown by way of example in the drawings as described in detail. It should be understood, however, that it is not intended to limit the invention to the particular forms disclosed, but, on the contrary, the intention is to cover all modifications, equivalents and alternatives falling within the spirit and scope of the invention as expressed in the appended claims. It is desired that the embodiments described above may be considered in all respects as illustrative, not restrictive, reference being made to the appended claims to indicate the scope of the invention.

I claim:

1. A support apparatus adapted to be positioned in a mussel growing operation having a mesh tubing that is substantially filled with aquatic mussels, where the support apparatus has a center portion, an upper portion and a lower portion and the support apparatus comprises:

a surface defining a support extension having a front portion and a base portion where the base portion is rigidly attached to the center portion of the support apparatus, the surface further defining an open area immediately to the adjacent sides of the support extension, whereas the support extension is adapted to be positioned through a portion of the mesh tubing and the upper surface of the support apparatus is adapted to support the said aquatic mussels, the upper surface defines radially extending support ribs.

2. A support apparatus adapted to be positioned in a mussel growing operation having a harvesting support that is adapted to grow aquatic mussels, where the support apparatus has a center portion, an upper portion and a lower portion and the support apparatus comprises:

a surface defining a support extension having a front portion and a base portion where the base portion is rigidly attached to the center portion of the support apparatus, the surface further defining an open area immediately to the adjacent sides of the support extension, whereas the support extension is adapted to be positioned through a portion of the harvesting support and the upper surface of the support apparatus is adapted to support the said aquatic mussels, the upper surface defines radially extending support ribs.

3. The apparatus as recited in claim 2 where the apparatus is substantially cylindrical in the plane orthogonal to the vertical axis.

4. A mussel growing assembly, comprising:

a) an elongate support member to support and grow aquatic mussels along the length of the elongate member;

b) a plurality of support structures, each having an upwardly facing support surface, each support structure having a front, rear, and side portions, with an open area between the side portions of the support structure to receive the elongate support member therein;

c) each support structure having a support extension positioned at said open area, said support extension having a base portion connecting to said support structure, and a connecting portion extending in said open area from said base portion to be able to connect to the elongate support member located in said open area;

whereby said support structures are able to be connected to said elongate support member at spaced connecting locations with said support member in said open area to provide support for mussels growing in elongate support members and/or in regions adjacent to said elongate support member.

5. The assembly as recited in claim 4, wherein each support structure has a central support portion and an outer support portion located around at least a substantial portion of said central support portion, at least a portion of said open area being a central open area portion at said central support portion which is arranged to have the elongate support member located therein.

6. The assembly as recited in claim 5, wherein said support extension extends at least into said central area portion to connect to said elongate support member.

7. The assembly as recited in claim 5, wherein said open area has a forwardly extending open area portion connected to said central open area portion and opening to a perimeter portion of said support structure, whereby the elongate support member is able to be positioned in said open area by being moved through a forward open end of said forward open area portion and to said central area portion.

8. The assembly as recited in claim 7, wherein the base portion of said support extension is firmly connected to said support structure and is arranged to extend into said open area to extend through said elongate support member to resist downward movement relative to said elongate support member.

9. The assembly as recited in claim 8, wherein said support extension has a locking surface configuration to permit entry of said connecting member through said elongate support member, but to resist withdrawal of said connecting member from said elongate support member.

10. The assembly as recited in claim 9, wherein said locking surface configuration comprises at least one tooth member having a side edge portion extending in a rearward and outward portion extending back toward the connecting member.

11. The assembly as recited in claim 10, wherein there is a plurality of said tooth members extending along a length of said support extension.

12. The assembly as recited in claim 10, wherein with said elongate support member comprises a mesh tubing, and said support extension is configured to extend through said mesh tubing.

13. The assembly as recited in claim 10, wherein with said elongate support member is a rope, and said support extension is arranged to extend through said rope.

14. The assembly as recited in claim 7, wherein said elongate support member comprises a mesh tubing, and said support extension is configured to extend through said mesh tubing.

15. The assembly as recited in claim 7, wherein said elongate support member is a rope, and said connecting member is arranged to extend through said rope.

16. A method of growing aquatic mussels comprising:

a) inserting seed mussels into an elongate mesh tubing;

b) providing a plurality of support devices, each of said support devices comprising:
  i) a support structure having an upwardly facing support surface, said support structure having front, rear, and side portions, with an open area between the side portions of the support structure;
  ii) a support extension positioned at said open area, said support extension having a base portion connecting to said support structure, and a connecting portion in said open area;

c) positioning said support devices at spaced locations along said mesh tubing, with said mesh tubing being located in the open area and with the support extension connecting to the mesh tubing, whereby each support device is able to be connected to said mesh tubing at a support location with said tubing in said open area, to provide support for mussels growing in said tubing, a region adjacent to said mesh tubing, or both in said tubing and adjacent to said tubing.

17. The method as recited in claim 16, wherein said support structure has a central support portion and an outer support portion located around at least a substantial portion of said central support portion, at least a portion of said open area being a central open area portion, said method further comprising locating said mesh tubing in said central open area portion.

18. The method as recited in claim 16, wherein said open area has a central open area portion and a forwardly extending open area portion connected to said central open area portion and opening to a perimeter portion of said support structure, said method further comprising positioning said mesh tubing in said open area by moving the mesh tubing into the forward open end of the support device and connecting the mesh tubing to the support extension.

19. The method as recited in claim 18, wherein said support extension is firmly connected to said support structure, said method further comprising moving said support extension through said mesh tubing to resist downward movement of said mesh tubing.

20. The method as recited in claim 19, wherein said support extension has a locking surface contour having a locking surface configuration to permit entry of said support extension through said mesh tubing but to resist withdrawal of said connecting member from said mesh tubing.

21. The method as recited in claim 20, wherein said locking surface configuration comprises a plurality of teeth, each having a side edge portion extending in a rearward and outward slant from a forward location on the connecting member and a back locking edge portion extending back toward the connecting member.

22. A method of growing aquatic mussels comprising:

a) providing an elongate support member;

b) providing a plurality of support devices, each of said support devices comprising:
  i) a support structure having an upwardly facing support surface, said support structure having front, rear, and side portions, with an open area between the side portions of the support structure;

ii) a support extension positioned at said open area, said support extension having a base portion connecting to said support structure, and a connecting portion in said open area;

c) positioning said support devices at spaced locations along said support member with the support member being located in the open area and with the support extension connecting to the support member, whereby each support device is able to be connected to said support member at a support location with said support member in said open area, to provide support for mussels growing in said support member, or in a region adjacent to said support member, or both in said support member and in a region around said support member.

23. The method as recited in claim 22, wherein each of said support devices has a central support portion and an outer support portion located around at least a substantial portion of said central support portion, at least a portion of said open area being a central open area portion, said method further comprising locating said support member in said central open area portion.

24. The method as recited in claim 22, wherein said open area has a central open area portion and a forwardly extending open area portion connected to said central open area portion and opening to a perimeter portion of said support structure, said method further comprising positioning said support member in said open area by moving the support member into the forward open end of the support device and connecting the support member to the support extension.

25. The method as recited in claim 24, wherein said support extension is firmly connected to said support structure, said method further comprising moving said support extension through said support member to resist downward movement of said support member.

26. The method as recited in claim 25, wherein said support extension has a locking surface contour having a locking surface configuration to permit entry of said support extension through said support member but to resist withdrawal of said connecting member from said support member.

27. The method as recited in claim 26, wherein said locking surface configuration comprises a plurality of teeth, each having a side edge portion extending in a rearward and outward slant from a forward location on the connecting member and a back locking edge portion extending back toward the connecting member.

* * * * *